US012773633B2

(12) United States Patent
Huang

(10) Patent No.: US 12,773,633 B2
(45) **Date of Patent: *Oct. 27, 2026**

(54) VIRTUAL OBJECT CONTROL METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Xiongfei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 540 days.

This patent is subject to a terminal disclaimer.

(21) Appl. No.: 18/457,152

(22) Filed: Aug. 28, 2023

(65) Prior Publication Data

US 2023/0398450 A1 Dec. 14, 2023

Related U.S. Application Data

(63) Continuation of application No. 17/362,953, filed on Jun. 29, 2021, now Pat. No. 11,779,843, which is a (Continued)

(30) Foreign Application Priority Data

May 24, 2019 (CN) ........................ 201910441241.2

(51) Int. Cl.
*A63F 13/5375* (2014.01)
*A63F 13/2145* (2014.01)
(Continued)

(52) U.S. Cl.
CPC ...... *A63F 13/5375* (2014.09); *A63F 13/2145* (2014.09); *A63F 13/44* (2014.09);
(Continued)

(58) Field of Classification Search
CPC .... A63F 13/537; A63F 13/2145; A63F 13/44; A63F 13/533; A63F 13/57; A63F 13/803
See application file for complete search history.

(56) References Cited

U.S. PATENT DOCUMENTS 5,989,123 A * 11/1999 Tosaki .................. A63F 13/803
463/47
7,193,629 B2 * 3/2007 Kake ...................... A63F 13/45
345/581

(Continued)

FOREIGN PATENT DOCUMENTS

CN 101485933 A 7/2009
CN 108434730 A 8/2018

(Continued)

OTHER PUBLICATIONS

The World Intellectual Property Organization (WIPO) International Search Report for PCT/CN2020/090272 Jul. 29, 2020 6 Pages (including translation).

(Continued)

*Primary Examiner* — Malina D. Blaise
(74) *Attorney, Agent, or Firm* — Anova Law Group, PLLC

(57) ABSTRACT

The present disclosure provides a method for controlling a virtual object performed by an electronic device. The method includes obtaining a first operation instruction when a virtual object performs an acceleration operation, the first operation instruction instructing the virtual object to perform a first target action; obtaining a second operation instruction within a first target time period after the first target action is completed, the second operation instruction instructing the virtual object to perform a second target action; adjusting a movement state of the virtual object from a first state to a second state, a first energy value collected by the virtual object per unit time in the first state being less than a second (Continued)

energy value collected by the virtual object per unit time in the second state; and adjusting an acceleration control button to an active state when an energy accumulation value reaches a trigger threshold.

18 Claims, 9 Drawing Sheets

Related U.S. Application Data continuation of application No. PCT/CN2020/090272, filed on May 14, 2020.

(51) Int. Cl.
*A63F 13/44* (2014.01)
*A63F 13/533* (2014.01)
*A63F 13/57* (2014.01)
*A63F 13/803* (2014.01)

(52) U.S. Cl.
CPC ............ *A63F 13/533* (2014.09); *A63F 13/57* (2014.09); *A63F 13/803* (2014.09)

(56) References Cited

U.S. PATENT DOCUMENTS 7,625,287 B2 * 12/2009 Champagne .......... G06F 3/0488 463/6
8,523,678 B2 * 9/2013 Yamashita ............ A63F 13/803 463/43
9,687,741 B1 * 6/2017 Kim .................... A63F 13/2145
10,449,451 B2 * 10/2019 Utsugi .................. A63F 13/573
11,071,911 B2 * 7/2021 Yabuki .................. A63F 13/803
11,573,087 B1 * 2/2023 Ito .......................... B63H 25/04
2007/0265087 A1 * 11/2007 Akahori .............. A63F 13/5258 463/37
2009/0054144 A1 * 2/2009 Peng ..................... G06F 3/0346 463/36
2009/0082077 A1 * 3/2009 Sugimori .............. A63F 13/245 463/40
2011/0275436 A1 * 11/2011 Kidakarn .............. A63F 13/803 463/37
2018/0104584 A1 * 4/2018 Utsugi .................. A63F 13/573
2020/0078668 A1 * 3/2020 Yabuki .................. A63F 13/426
2020/0086209 A1 * 3/2020 Yabuki ................ A63F 13/2145
2020/0086214 A1 * 3/2020 Yabuki .................. A63F 13/803
2021/0008445 A1 * 1/2021 Hayashi ................ A63F 13/573
2021/0245053 A1 * 8/2021 Weng .................... A63F 13/422
2022/0168645 A1 6/2022 Huang et al.
2023/0226445 A1 * 7/2023 Buxton, III ........... A63F 13/213 463/6

FOREIGN PATENT DOCUMENTS

CN 108733288 A 11/2018
CN 109513210 A 3/2019
CN 110090443 A 8/2019
JP 2016120131 A 7/2016

OTHER PUBLICATIONS

The State Intellectual Property Office of the People's Republic of China (SIPO) Office Action 1 for for 201910441241.2 Dec. 27, 2019 10 Pages (including translation).
The State Intellectual Property Office of the People's Republic of China (SIPO) Office Action 3 for for 201910441241.2 Oct. 20, 2020 5 Pages (including translation).
Watch the Sea and Listen to the Tide Play Games, "(Non-official translation) Kart Rider Rush: 3 main fingering ways you need to know: Hit Repeatedly the Arrows to Drift. Hit and Press the Arrows to drift. Cut Drift to Refill Boost," Retrieved from the Internet: URL: https://www.sohu.com/a/312100136_120099903, May 6, 2019, pp. 1-3. 6 Pages (including translation).
Kele Movie&Television Culture Media, "Experts challenge the L2 driver's license test with a cart? Huyafengjuan Crazyracing KartRider mobile game tests Tiancity Tencent cooperation," Retrieved from the Internet: URL: https://www.bilibili.com/video/av46077507?from=search&seid=9311118654848197163, Mar. 12, 2019 (Mar. 12, 2019), Full video length. 5 pages.
Korean Intellectual Property Office (KIPO) Request for the Submission of an Opinion for 10-2021-7026763 Jul. 10, 2023 22 Pages (including translation).
Xiaocaoyue, spent 110,000 coupons for actual measurement! The Gospel A car [Devil King], a player who can't get krypton gold, actually got bankrupt [Garena Speed Field] Youtube, 2019.
Xrabbit, "720p HD★ Garena Speed Drifters—Double Boost, YouTube", Jan. 18, 2019, https://www.youtube.com/watch?v=OPZUrVu3KPo.
Japan Patent Office (JPO) The Office Action For JP Application No. 2021-538740 Aug. 23, 2022 12 Pages (Translation Included).
Intellectual Property Office of Singapore Written Opinion for Application No. 11202108697R Sep. 11, 2024 6 pages.
"KartRider official racing version click and drag operation skills", Apr. 28, 2019 (Apr. 28, 2019), Citation not enclosed due to copyright restrictions. A copy may be obtained from the URL at https://m.9k9k.com/gonglue/121696.html.

* cited by examiner

VIRTUAL OBJECT CONTROL METHOD AND APPARATUS, STORAGE MEDIUM, AND ELECTRONIC DEVICE

RELATED APPLICATIONS

This application is a continuation application of U.S. application Ser. No. 17/362,953, filed on Jun. 29, 2021; U.S. application Ser. No. 17/362,953 is a continuation application of PCT Application No. PCT/CN2020/090272, entitled “Virtual object control method and apparatus, storage medium, and electronic device” and filed on May 14, 2020, which claims priority to Chinese Patent Application No. 201910441241.2, entitled “VIRTUAL OBJECT CONTROL METHOD AND APPARATUS, STORAGE MEDIUM, AND ELECTRONIC DEVICE” filed with the China National Intellectual Property Administration on May 24, 2019. All of the above-mentioned applications are incorporated herein by reference in their entirety.

FIELD OF THE TECHNOLOGY

This application relates to the computer field, and specifically, to a method for controlling virtual objects.

BACKGROUND OF THE DISCLOSURE

In a computer game scene of a racing game application, different game props or game abilities are generally configured for virtual objects in the game scene. To ensure fairness of a round of game, trigger conditions are also configured for the game props or the game abilities synchronously. For example, an energy tank having an energy trigger threshold is configured for a game prop or a game ability.

However, when running a round of game, a fixed energy value can be accumulated for a game prop or a game ability matching a virtual object only after the virtual object performs a target action once. In other words, currently, the virtual object needs to perform the target action repeatedly to accumulate energy in the energy tank, so that the energy accumulated in the energy tank can reach the energy trigger threshold. After energy in the energy tank reaches the energy trigger threshold, the virtual object obtains a permission to use a game prop or cast a game ability.

SUMMARY

Embodiments of this application provide a virtual object control method and apparatus, a storage medium, and an electronic device, to at least resolve a technical problem of high operation complexity in a virtual object control process in the related art.

One aspect of the embodiments of this application provides a method for controlling a virtual object, performed by an electronic device. The method includes obtaining a first operation instruction in a process that a virtual object controlled by a client performs an acceleration operation, the first operation instruction instructing the virtual object to perform a first target action; obtaining a second operation instruction within a first target time period after the first target action is completed, the second operation instruction instructing the virtual object to perform a second target action; adjusting a movement state of the virtual object from a first state to a second state within a second target time period after the virtual object starts to perform the second target action, a first energy value collected by the virtual object per unit time in the first state being less than a second energy value collected by the virtual object per unit time in the second state; and adjusting a state of an acceleration control button corresponding to the acceleration operation to an active state when an energy accumulation value of the collected energy reaches a trigger threshold.

Another aspect of the present disclosure provides an apparatus for controlling a virtual object. The apparatus includes a first obtaining unit, configured to obtain a first operation instruction in a process that a virtual object controlled by a client performs an acceleration operation, the first operation instruction instructing the virtual object to perform a first target action; a second obtaining unit, configured to obtain a second operation instruction within a first target time period after the first target action is completed, the second operation instruction instructing the virtual object to perform a second target action; a first control unit, configured to adjust a movement state of the virtual object from a first state to a second state within a second target time period after the virtual object starts to perform the second target action, a first energy value collected by the virtual object per unit time in the first state being less than a second energy value collected by the virtual object per unit time in the second state; and a second control unit, configured to adjust a state of an acceleration control button corresponding to the acceleration operation to an active state when an energy accumulation value of the collected energy reaches a trigger threshold.

Another aspect of the embodiments of this application provides a non-transitory computer readable storage medium. The computer readable medium includes a computer program stored therein, the computer program, when run, implementing a method for controlling a virtual object. The method includes obtaining a first operation instruction in a process that a virtual object controlled by a client performs an acceleration operation, the first operation instruction instructing the virtual object to perform a first target action; obtaining a second operation instruction within a first target time period after the first target action is completed, the second operation instruction instructing the virtual object to perform a second target action; adjusting a movement state of the virtual object from a first state to a second state within a second target time period after the virtual object starts to perform the second target action, a first energy value collected by the virtual object per unit time in the first state being less than a second energy value collected by the virtual object per unit time in the second state; and adjusting a state of an acceleration control button corresponding to the acceleration operation to an active state when an energy accumulation value of the collected energy reaches a trigger threshold.

According to still another aspect of the embodiments of this application, an electronic device is further provided, including a memory, a processor and a computer program stored in the memory and executable on the processor, the processor performing the foregoing virtual object control method by using the computer program.

In the embodiments of this application, when a virtual object performs an acceleration operation, after a first target action is completed, if a second operation instruction instructing to perform a second target action is further obtained within a first target time period, a movement state of the virtual object is adjusted from a first state to a second state within a second target time period after the second target action is started, so that the virtual object starts to collect energy according to a second energy value corresponding to the second state. The energy value collected by the virtual object per unit time is increased by using the foregoing control method, and energy collection efficiency is improved, so that a waiting time for activating an acceleration control button is shortened in a game. Moreover, it is unnecessary to perform a target action repeatedly to collect energy, thereby simplifying control operations on the virtual object and reducing the operation complexity, thus resolving the technical problem of high operation complexity in a virtual object control process.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

Figure 1:
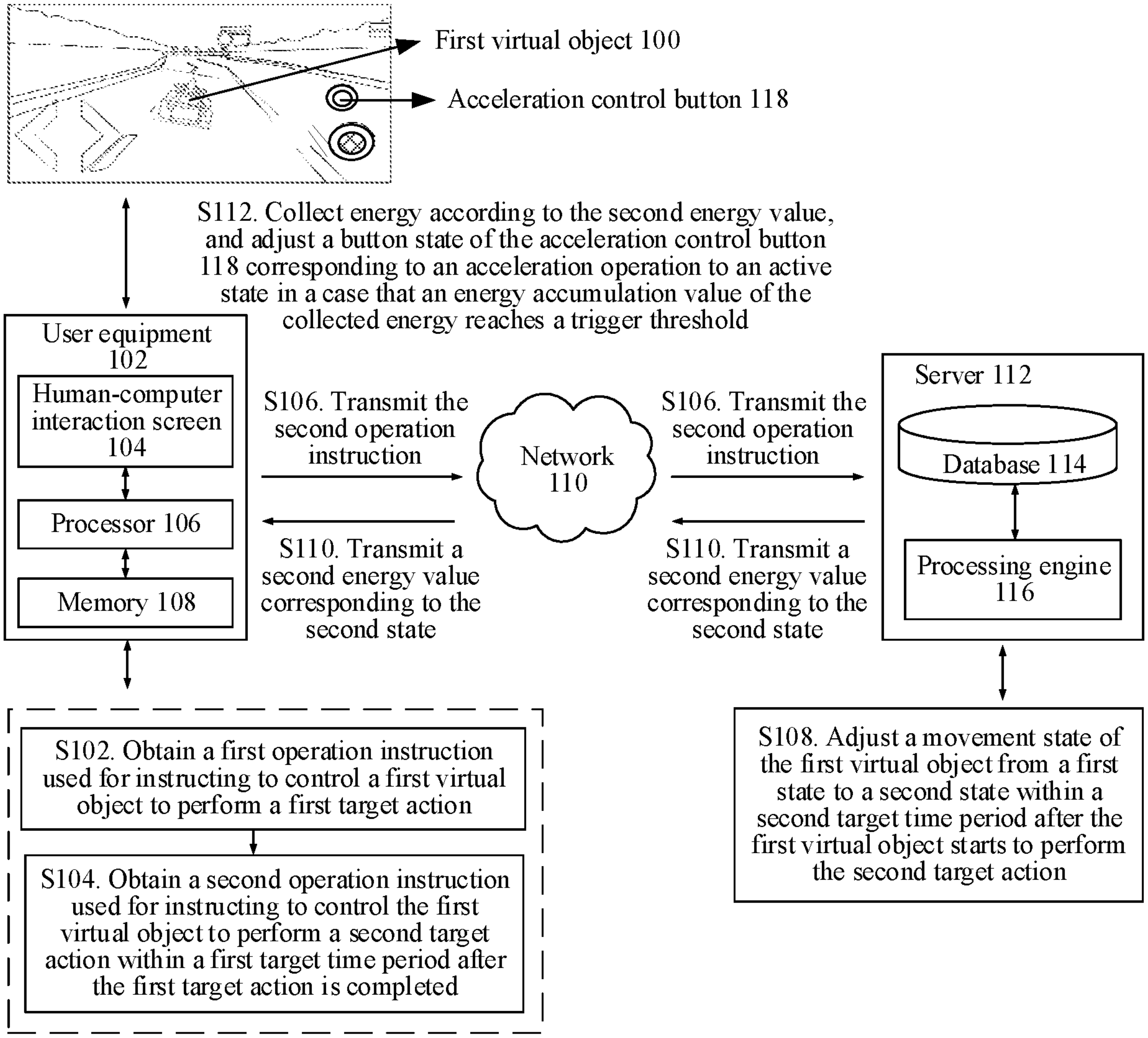
FIG. 1 is a schematic diagram of a network environment of a virtual object control method according to an embodiment of this application.

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this application, a virtual object control method is provided. In some embodiments, the virtual object control method may be applicable to, but not limited to, a virtual object control system in a network environment shown in FIG. 1. The virtual object control system includes a user equipment 102, a network 110, and a server 112. It is assumed that a client of a game application (a client of a racing game application shown in FIG. 1) is installed on the user equipment 102. The user equipment 102 includes a human-computer interaction screen 104, a processor 106, and a memory 108. The human-computer interaction screen 104 is configured to detect a human-computer interaction operation (for example, a touch operation) through a human-computer interaction interface corresponding to the client. The processor 106 is configured to generate a corresponding operation instruction according to the human-computer interaction operation, and control a virtual object, which is controlled by the client, to perform a first target action or a second target action in response to the operation instruction. The memory 108 is configured to store the operation instruction and attribute information related to the virtual object. For example, the attribute information may include, but is not limit to, a movement state of the virtual object and an energy value in an energy tank.

In a process that a virtual object 100 controlled by the client installed on the user equipment 102 performs an acceleration operation, in S102, a first operation instruction used for instructing to control the virtual object 100 to perform a first target action is obtained by using the human-computer interaction screen 104. In S104, a second operation instruction used for instructing to control the virtual object 100 to perform a second target action is obtained within a first target time period after the first target action is completed.

Further, in S106, the processor 106 transmits the second operation instruction to the server 112 by using the network 110. The server 112 includes a database 114 and a processing engine 116. The database 114 is configured to store state information of a first state and a second state, for example, a mapping relationship between the first state and a first energy value and a mapping relationship between the second state and a second energy value. The processing engine 116 is configured to control the virtual object 100 to perform the second target action according to the received second operation instruction and obtain a moment at which the second target action is started.

The processing engine 116 in the server 112 then performs, according to the mapping relationship stored in the database 114 and in response to the received second operation instruction, S108 of controlling to adjust a movement state of the virtual object 100 from the first state to the second state within a second target time period after the virtual object 100 starts to perform the second target action. A first energy value collected by the virtual object 100 per unit time in the first state is less than a second energy value collected by the virtual object 100 per unit time in the second state. S110 of transmitting a second energy value corresponding to the second state to the user equipment 102 by using the network 110 is then performed. Further, the processor 106 in the user equipment 102 performs S112: collecting energy according to the second energy value, and adjusting a state of an acceleration control button 118 corresponding to an acceleration operation to an active state when an energy accumulation value of the collected energy reaches a trigger threshold.

Figure 2:
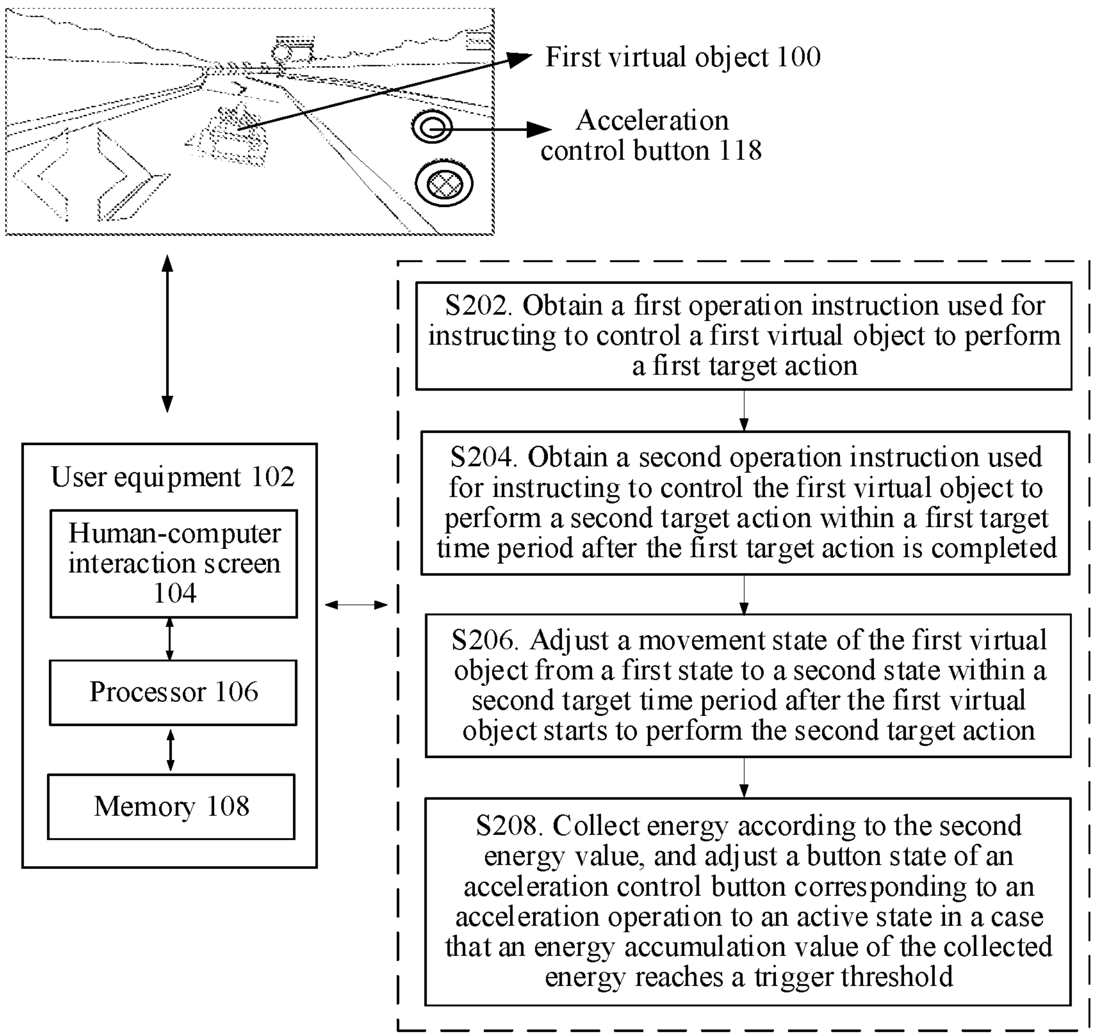
FIG. 2 is a schematic diagram of a hardware environment of a virtual object control method according to an embodiment of this application.

In addition, in one embodiment, the foregoing virtual object control method may alternatively be applicable to, but is not limited to, a hardware environment shown in FIG. 2. It is still assumed that a client of a game application (a client of a racing game application shown in FIG. 2) is installed on the user equipment 102. The user equipment 102 includes the human-computer interaction screen 104, the processor 106, and the memory 108. The user equipment 102 performs the following steps by using the processor 106. In S202, a first operation instruction used for instructing to control a virtual object 100 to perform a first target action is obtained by using the human-computer interaction screen 104. In S204, a second operation instruction used for instructing to control the virtual object 100 to perform a second target action is obtained within a first target time period after the first target action is completed. Then, in S206, a movement state of the virtual object is controlled to adjust from a first state to a second state within a second target time period after the virtual object starts to perform the second target action. A first energy value collected by the virtual object 100 per unit time in the first state is less than a second energy value collected by the virtual object 100 per unit time in the second state. Further, in S208, the virtual object 100 is controlled to collect energy according to the second energy value, and a state of an acceleration control button 118 corresponding to an acceleration operation is adjusted to an active state when an energy accumulation value of the collected energy reaches a trigger threshold.

In a process that a virtual object performs an acceleration operation, after a first target action is completed, if a second operation instruction used for instructing to perform a second target action is further obtained within a first target time period, a movement state of the virtual object is adjusted from a first state to a second state within a second target time period after the second target action is started, so that the virtual object starts to collect energy according to a second energy value corresponding to the second state. The energy value collected by the virtual object per unit time is increased by using the foregoing control logic, and energy collection efficiency is improved, so that a waiting time for activating an acceleration control button is further shortened. Moreover, it is unnecessary to perform a target action repeatedly to collect energy, thereby simplifying control operations on the virtual object and reducing the operation complexity, thus overcoming a problem of high operation complexity in virtual object control in the related art.

In some embodiments, in this embodiment, the user equipment may be, but is not limited to, a computer device that supports running of an application client, such as a mobile phone, a tablet computer, a notebook computer, or a PC. The server and the user equipment may perform, but not limited to, data exchange with each other through a network, and the network may include, but not limited to, a wireless network or a wired network. The wireless network includes Bluetooth, Wi-Fi, and another network implementing wireless communication. The wired network may include, but not limited to a wide area network, a metropolitan area network, and a local area network. The foregoing description is merely an example, which is not limited in this embodiment.

Figure 3:
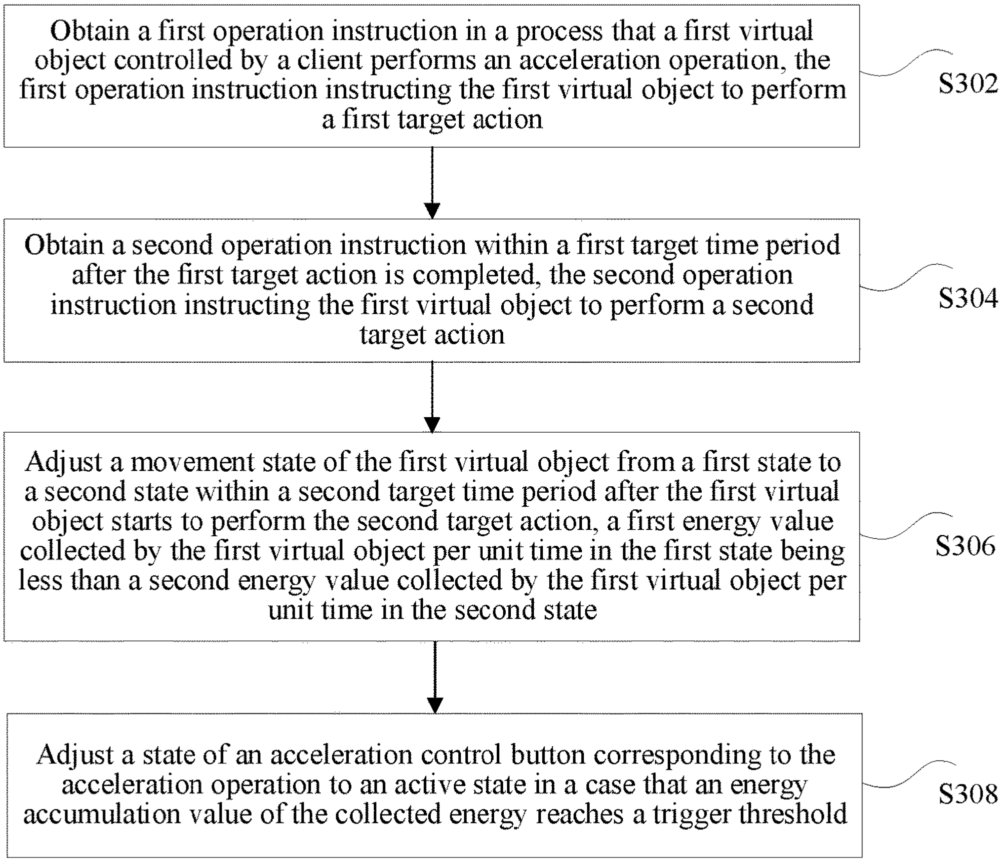
FIG. 3 is a flowchart of a virtual object control method according to an embodiment of this application.

In some embodiments, in one embodiment, the foregoing virtual object control method may be performed through an electronic device, and the electronic device may be the foregoing user equipment and/or server. As shown in FIG. 3, the virtual object control method includes the following steps:

S302. Obtain a first operation instruction in a process that a virtual object controlled by a client performs an acceleration operation.

The first operation instruction is used for instructing to control the virtual object to perform a first target action.

In one embodiment, an execution time of the first target action is less than β first threshold.

S304. Obtain a second operation instruction within a first target time period after the first target action is completed.

The second operation instruction is used for instructing to control the virtual object to perform a second target action.

S306. Adjust a movement state of the virtual object from a first state to a second state within a second target time period after the virtual object starts to perform the second target action.

A first energy value collected by the virtual object per unit time in the first state is less than a second energy value collected by the virtual object per unit time in the second state.

S308. Adjust a state of an acceleration control button corresponding to the acceleration operation to an active state when an energy accumulation value of the collected energy reaches a trigger threshold.

The steps of the method shown in FIG. 3 are applicable to, but are not limited to, the virtual object control system shown in FIG. 1, and completed through data exchange between the user equipment 102 and the server 112, and are also applicable to, but are not limited to, the user equipment 102 shown in FIG. 2, and completed by the user equipment 102 independently. The foregoing description is merely an example, which is not limited in this embodiment.

In some embodiments, in this embodiment, the virtual object control method is applicable to, but is not limited to, a game application, such as a racing game application. In a process that a client of the game application controls a virtual object to perform an action combination of a first target action and a second target action, adjustment of a movement state of the virtual object is triggered, so that efficiency of the virtual object of obtaining a game prop or a game ability is also adjusted.

In some embodiments, in a racing game, an energy tank is usually configured for a virtual object, so that an energy accumulation value collected by a user controlling the virtual object can be intuitively displayed through a visualized virtual pattern of the energy tank.

For example, by improving an energy value collected per unit time by an energy tank corresponding to a game prop or a game ability, a time it takes for the energy accumulation value collected in the energy tank to reach a trigger threshold may be shortened. The virtual object may be, but is not limited to, an object such as a virtual role, virtual equipment, or a virtual vehicle manipulated by a player in the racing game application. The first target action and the second target action may include, but are not limited to, a drift operation performed by the virtual object when passing through a bend configured in a game task. The first target action and the second target action may be, but are not limited to, drift actions performed according to the same direction. The foregoing description is merely an example, which is not limited in this embodiment.

Figure 4:
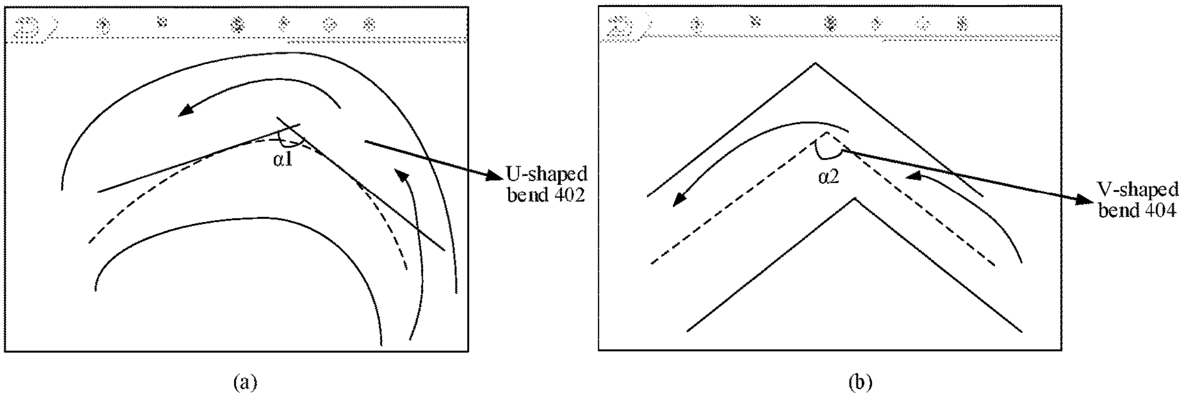
FIG. 4 is a schematic diagram of a virtual object control method according to an embodiment of this application.

Moreover, in this embodiment, the virtual object control method is applicable to, but is not limited to, a special bend in a racing game task, such as a U-shaped bend or a V-shaped bend that is short and sharp. As shown in FIG. 4(*a*), in a U-shaped bend 402 with a bend angle less than $\alpha 1$, a combination of the first target action and the second target action is performed according to a given time condition, to trigger automatic adjustment of the movement state of the virtual object, so that the energy value collected per unit time is correspondingly adjusted. As shown in FIG. 4(*b*), in a V-shaped bend 404 with a bend angle less than $\alpha 2$, a combination of the first target action and the second target action is performed according to a given time condition, to trigger automatic adjustment of the movement state of the virtual object, so that the energy value collected per unit time is correspondingly adjusted.

In this embodiment, in a process that the virtual object performs an acceleration operation, after the first target action is completed, if a second operation instruction used for instructing to perform the second target action is further obtained within a first target time period, the movement state of the virtual object is controlled to adjust from a first state to a second state within a second target time period after the second target action is started, so that the virtual object starts to collect energy according to a second energy value corresponding to the second state. The energy value collected by the virtual object per unit time is increased by using the foregoing control logic, and energy collection efficiency is improved, so that a waiting time for activating an acceleration control button is further shortened. Moreover, it is unnecessary to perform a target action repeatedly to collect energy, thereby simplifying control operations on the virtual object and reducing the operation complexity.

Further, after the collection time is shortened, the state of the acceleration control button corresponding to the acceleration operation may be adjusted to the active state as soon as possible, and a user may be prompted in a plurality of manners. For example, the acceleration control button is switched from a grey state to a colorful state, or a texture of the acceleration control button is rendered at a blank control position again to prompt the user, so that the player can trigger next acceleration control over the virtual object as soon as possible, thereby shortening a total time consumed by the virtual object to complete the current racing game task, and further improving a win rate of the virtual object in the racing game task.

In some embodiments, in this embodiment, the movement state may be used for, but is not limited to, indicating a stress state of a force on the virtual object in a moving process. The force includes steering force for controlling the virtual object to complete a target action, and/or friction for preventing the virtual object from moving forward.

That is, a speed of the virtual object in a game task in changed by adjusting the force on the virtual object, to shorten an energy collection time by changing the energy value collected per unit time associated with the speed. For example, the steering force for the virtual object is increased, and/or the friction for the virtual object is decreased, so that a lateral speed of the virtual object is increased, to help increase the first energy value collected by the virtual object per unit time to the second energy value. In this way, the energy accumulation value (for example, displayed in the energy tank) can reach the trigger threshold as soon as possible, so that the state of the acceleration control button configured to trigger the acceleration operation and corresponding to the energy accumulation value is adjusted to the active state in time, making it convenient for the player to trigger a next acceleration operation as soon as possible, thereby shortening a total time consumed by the virtual object to complete a round of game and improving a win rate of the virtual object in a game task.

Figure 5:
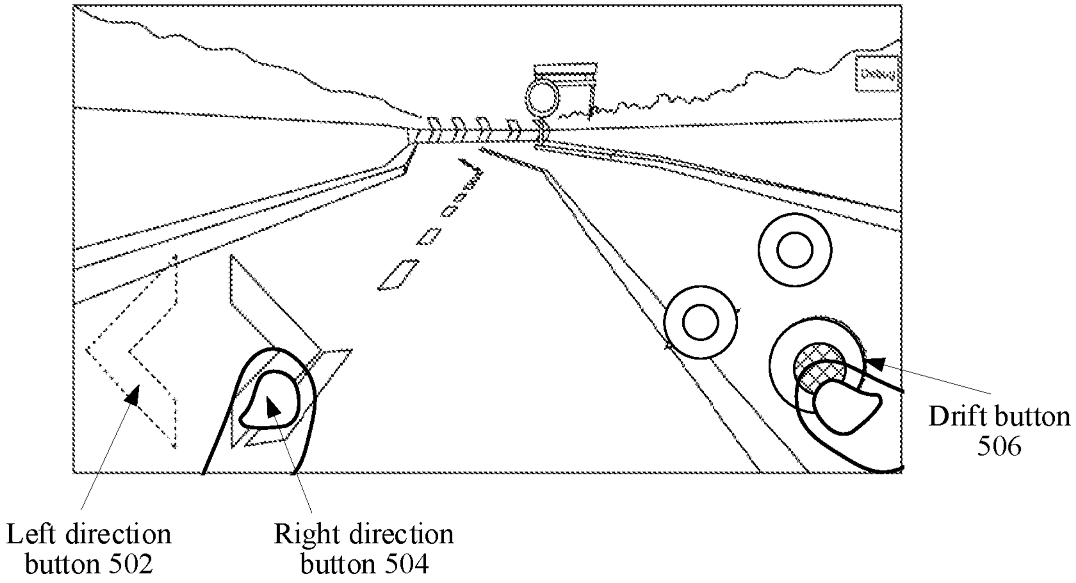
FIG. 5 is a schematic diagram of another virtual object control method according to an embodiment of this application.

In some embodiments, in this embodiment, the target action may be, but is not limited to, implemented by a control button displayed in a human-computer interaction interface of the client. The control button may include, but is not limited to, a first control button configured to control a forward direction of the virtual object, and a second control button configured to trigger the virtual object to perform the target action. When the first control button and the second control button are in a touch and hold operation state simultaneously, the target object is triggered to perform the target action once. The first control button may be, but is not limited to, direction control buttons shown in FIG. 5, such as a “left direction button” 502 and a “right direction button” 504. The second control button may be, but is not limited to, a trigger control button shown in FIG. such as a “drift button” 506. Further, in this embodiment, the first target action and the second target action may be, but are not limited to, drift actions pointing to the same direction. For example, the first target action is a “drift-to-the-left action” triggered by performing a touch-and-hold operation on the “left direction button” 502 and the “drift button” 506 simultaneously, and the second target action is also correspondingly a “drift-to-the-left action” triggered by performing a touch-and-hold operation on the “left direction button” 502 and the “drift button” 506 simultaneously. In another example, the first target action is a “drift-to-the-right action” triggered by performing a touch-and-hold operation on the “right direction button” 504 and the “drift button” 506 simultaneously, and the second target action is also correspondingly a “drift-to-the-right action” triggered by performing a touch-and-hold operation on the “right direction button” 504 and the “drift button” 506 simultaneously.

Figure 6:
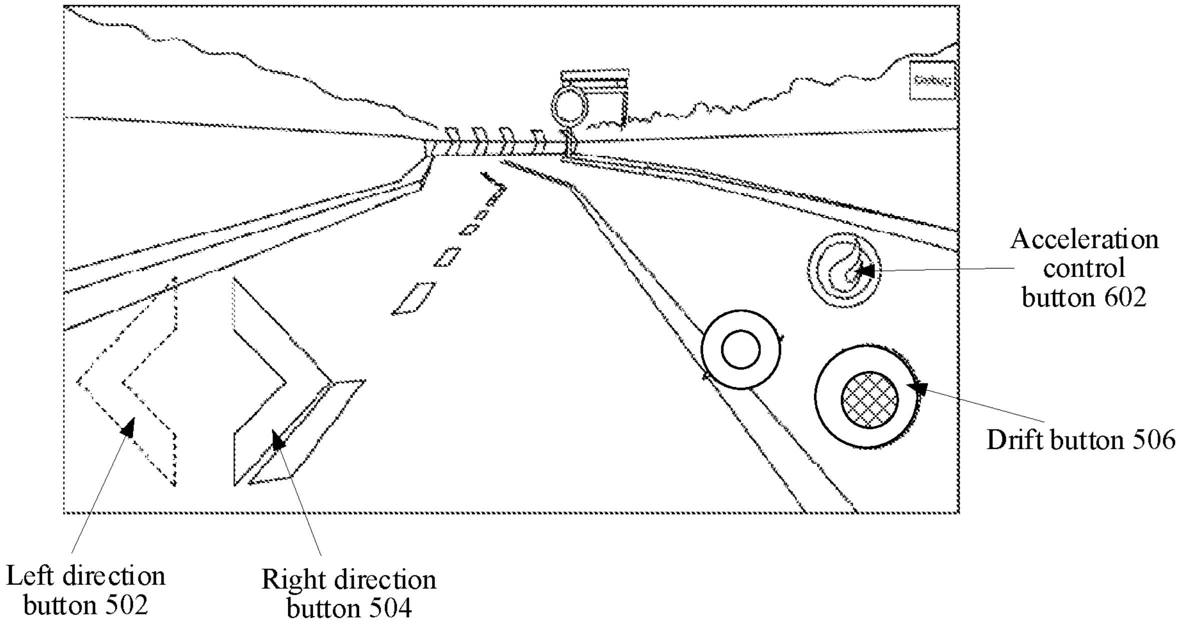
FIG. 6 is a schematic diagram of still another virtual object control method according to an embodiment of this application.

Moreover, in this embodiment, before the virtual object obtains the first operation instruction, the method further includes: obtaining an acceleration instruction generated by performing an operation on the acceleration control button; and controlling the virtual object to perform an acceleration operation in response to the acceleration instruction, to enter an accelerated state. For example, as shown in FIG. 6, after obtaining the acceleration instruction generated by performing a tap operation on the acceleration control button 602, the virtual object is controlled to perform an acceleration operation to enter an accelerated state. Therefore, in the accelerated state, the first operation instruction used for instructing to perform the first target action and the second operation instruction used for instructing to perform the second target action are obtained. Further, adjustment of the movement state of the virtual object is performed within a target time period after the second target action is started, so that the speed and the energy collection efficiency of the virtual object are improved.

Figure 7:
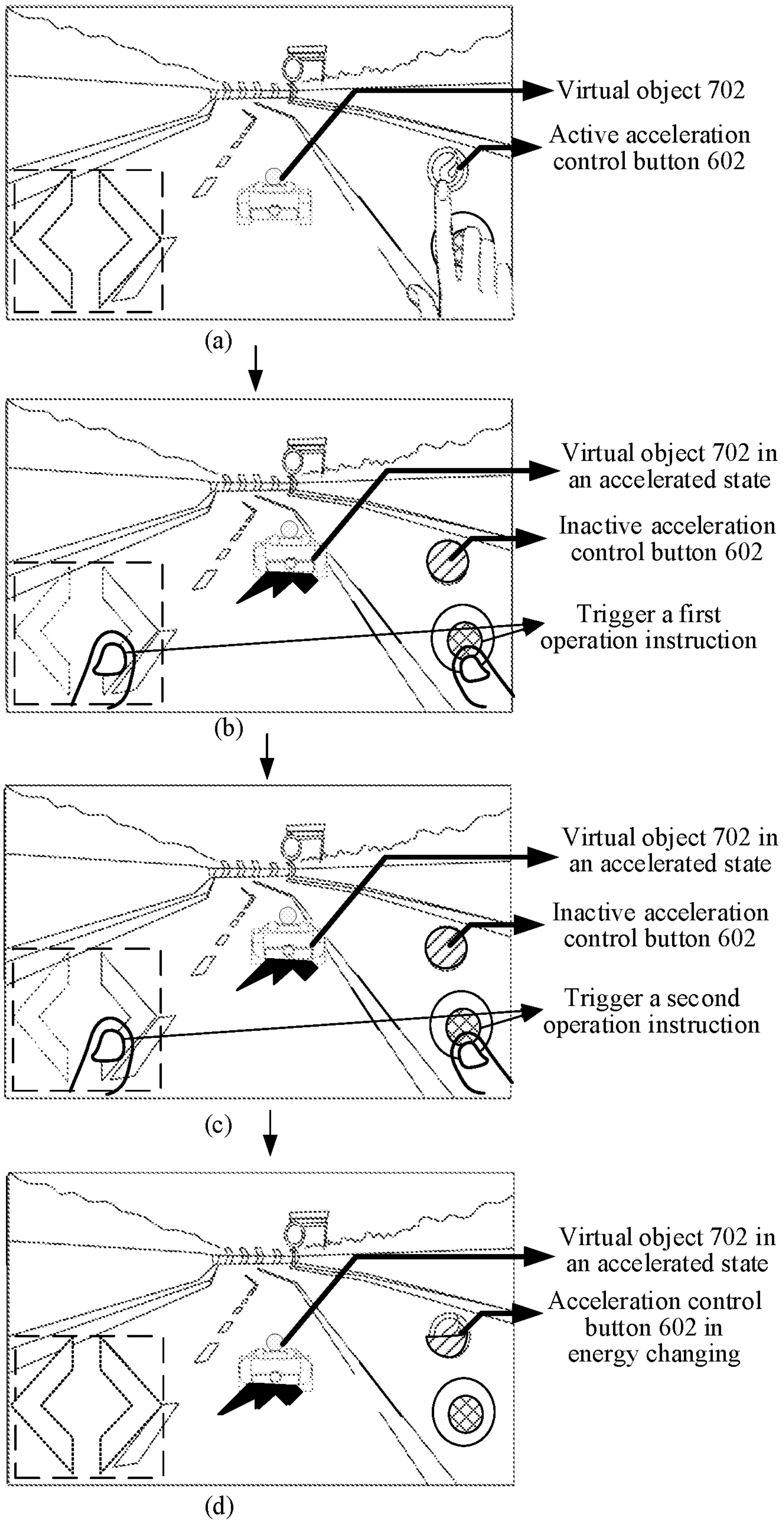
FIG. 7 is a schematic diagram of still another virtual object control method according to an embodiment of this application.

Specifically, description is made by using an example shown in FIG. 7: it is assumed that a racing game application is still used as an example. In a process that a virtual object (a virtual object 702 shown in the figure) controlled by a client performs a round of game task, as shown in FIG. 7(*a*), an acceleration instruction generated by a player by performing a tap operation on an acceleration control button 602 in an active state in a human-computer interaction interface is detected, and the virtual object 702 is controlled to perform an acceleration operation in response to the acceleration instruction, to enter an accelerated state. In addition, as shown in FIG. 7(*b*), a state of the acceleration control button is adjusted to an inactive state.

Further, as shown in FIG. 7(*b*), in a process that the virtual object 702 is in the accelerated state, a first operation instruction triggered by performing a touch-and-hold operation on a "right direction button" and a "drift button" in the human-computer interaction interface is detected, and the virtual object 702 is controlled to perform a first target action, such as a drift-to-the-right action. An execution time of the first target action herein is less than α first threshold. That is, after it is determined that the drift-to-the-right action is triggered, the "right direction button" and the "drift button" are released as soon as possible, and the touch-and-hold operation is no longer performed, to cause the virtual object 702 to enter passive drifting.

A drift angle of the drift-to-the-right action corresponding to the first target action may be less than a preset angle threshold, for example, the angle is less than or equal to 10 degrees. This application is not limited thereto.

As shown in FIG. 7(*c*), within a first target time period after the first target action is completed, a second operation instruction triggered by performing a touch-and-hold operation on the "right direction button" and the "drift button" in the human-computer interaction interface is detected again, and the virtual object 702 is controlled to perform a second target action, such as the drift-to-the-right action. Within a second target time period after the virtual object 702 starts to perform a second target action (that is, the drift-to-the-right action), a movement state of the virtual object 702 is adjusted from a first state to a second state, so that an energy value collected by the virtual object per unit time for an energy tank corresponding to the acceleration control button 602 is adjusted from a first energy value to a second energy value, where the first energy value is less than the second energy value. As shown in FIG. 7(*d*), the virtual object 702 collects energy according to the foregoing second energy value after the adjustment, and as shown in the figure, a button identifier corresponding to the "acceleration control button in energy changing" can also display a state of energy collection. For example, energy collection efficiency in the energy tank may be represented according to a color recovery speed of the button identifier.

Figure 8:
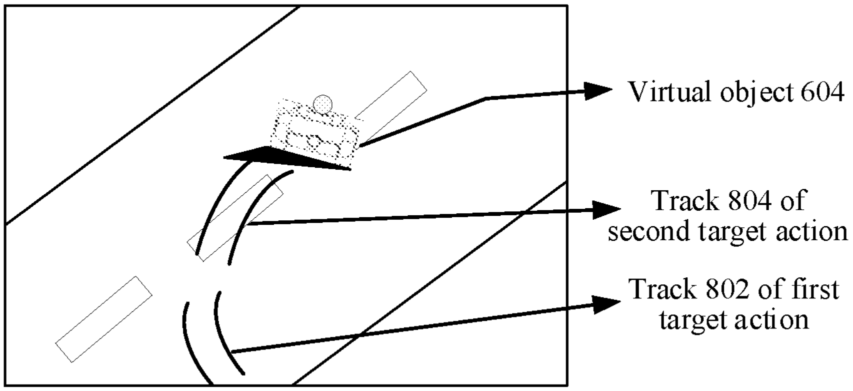
FIG. 8 is a schematic diagram of still another virtual object control method according to an embodiment of this application.

Further, as shown in FIG. 8, after the first target action is completed, a track (a track 802 of the first target action) is displayed in a game bend, and a display length of the track 802 matches an execution time of the first target action. Further, after the second target action is completed, a track (a track 804 of the second target action) is further displayed, and a display length of the track 804 matches an execution time of the second target action. For example, the first target action may be a "tap drift" action. That is, after it is determined that a drift action is triggered, the control button is released quickly, to cause the virtual object to enter a passive drifting state, so that a track 802 formed by the "tap drift" action is relatively short. Further, the second target action may be a "streak" action, that is, a track 804 formed by the drift action is relatively long. A combination of the two target actions may also be identified by a "tap streak", and when steps of the process shown in FIG. 7 are completed and a display condition is met, prompt information is displayed on the client to prompt the user that the "tap streak" is completed.

Figure 9:
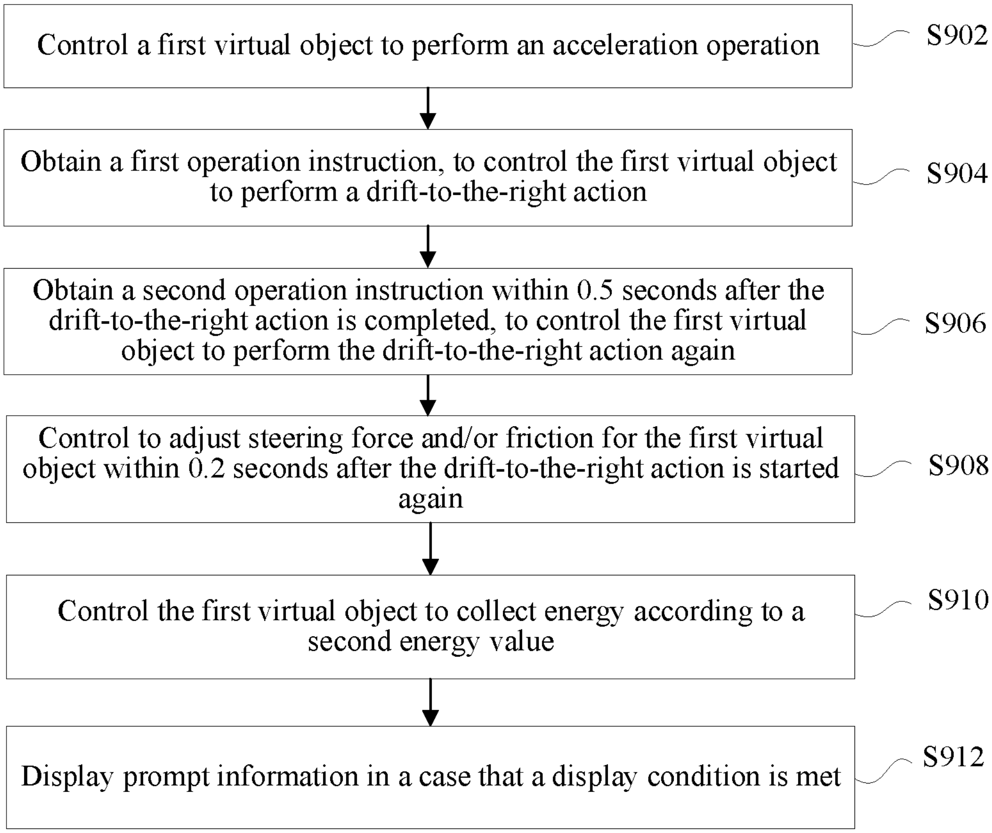
FIG. 9 is a flowchart of another virtual object control method according to an embodiment of this application.

In addition, it is assumed that the performing an action combination once in this embodiment includes performing a drift-to-the-right action twice, a procedure of control logic of the virtual object control method may include, but is not limited to, the following steps shown in FIG. 9:

In S902 to S912, a virtual object is controlled to perform an acceleration operation, and a first operation instruction is obtained in a process of the acceleration, to control the virtual object to perform a drift-to-the-right action. A time after the drift-to-the-right action is completed is then detected. Within 0.5 seconds after the drift-to-the-right action is completed, a second operation instruction is obtained, to control the virtual object to perform the drift-to-the-right action again. Within 0.2 seconds after the drift-to-the-right action is started again, a movement state of the virtual object is adjusted. For example, the steering force and/or friction of the movement may be adjusted. Energy is then collected according to a second energy value corresponding to a second state after the adjustment. Further, when the action combination is completed, and a display condition is met, prompt information is displayed, for example, to prompt a player that a "tap streak" action is completed.

The 0.5 seconds, the 0.2 seconds, and the "tap streak" prompt information mentioned in the foregoing embodiment are examples, which are not limited in this embodiment.

According to the embodiments provided in this application, in a process that a virtual object performs an acceleration operation, after a first target action of which an execution time is less than a first threshold is completed, when a second operation instruction used for instructing to perform a second target action is obtained again within a first target time period, a movement state of the virtual object is controlled to adjust from a first state to a second state within a second target time period after the second target action is started, so that the virtual object starts to collect energy according to a second energy value corresponding to the second state. According to the foregoing control logic, a first energy value collected for an energy tank per unit time is triggered to be adjusted and increased to a greater second energy value, to improve the energy collection efficiency of the energy tank, thereby shortening a collection time for a collected energy accumulation value to reach a trigger threshold of the energy tank. In this way, it is unnecessary to perform a target action repeatedly to collect energy, thereby simplifying control operations on the virtual object and reducing operation complexity, thus further overcoming a problem of high operation complexity in virtual object control in the related art.

In one embodiment, the controlling to adjust a movement state of the virtual object from a first state to a second state within a second target time period after the virtual object starts to perform the second target action includes:

S1, obtaining a first parameter value corresponding to a force on the virtual object in the first state; and

S2, adjusting the first parameter value to a second parameter value corresponding to the second state.

In some embodiments, during the adjustment of the parameter value in S2, the adjustment from the first parameter value to the second parameter value may alternatively be performed according to a target proportion.

In this embodiment, the movement state may be used for, but is not limited to, indicating a stress state of the force on the virtual object in a moving process. The force on the virtual object in a game process includes: forward force for driving the virtual object to move forward, and/or steering force for controlling the virtual object to complete a target action, and friction for preventing the virtual object from moving forward. The first parameter value may be, but is not limited to, a parameter value of each acting force before the adjustment; and the second parameter value may be, but is not limited to, a parameter value of each acting force after the adjustment.

In addition, the target proportion may be set to, but is not limited to, different values according to various scenes, which is not limited in this embodiment.

In some embodiments, in this embodiment, S2 of adjusting the first parameter value to a second parameter value corresponding to the second state includes:

S21, when the force includes steering force, the first parameter value includes a first force parameter value, and the second parameter value includes a second force parameter value, increasing the first force parameter value of the virtual object to the second force parameter value according to a first target proportion, a direction of the steering force being perpendicular to a forward direction of the virtual object; and

S22, when the force includes friction, the first parameter value includes a first friction parameter value, and the second parameter value includes a second friction parameter value, decreasing the first friction parameter value of the virtual object to the second friction parameter value according to a second target proportion.

An execution sequence of S21 and S22 is not limited.

In this embodiment, when the movement state of the virtual object is adjusted, parameter values of the steering force and/or friction may be adjusted. This application is not limited thereto. For example, the steering force is increased, and/or the friction is decreased, so that a speed magnitude of a lateral speed vector of the virtual object in a process of performing the second target action can be improved, thereby improving energy collected per unit time for the energy tank.

Figure 10:
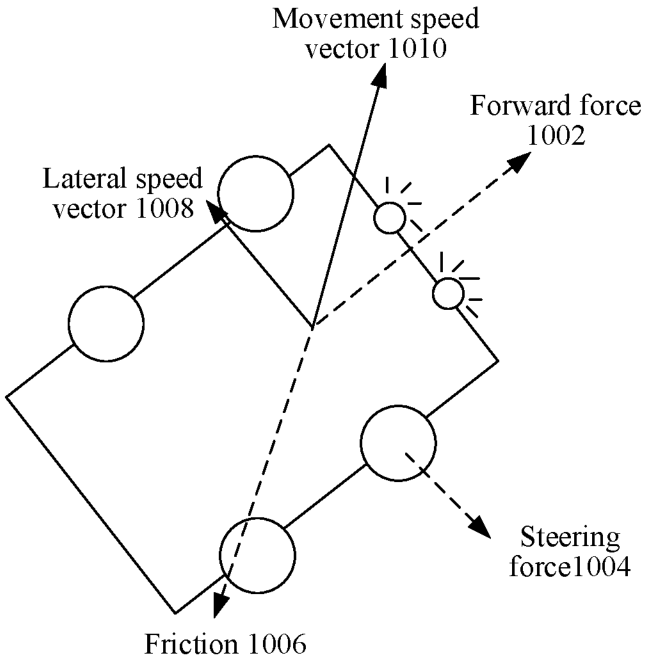
FIG. 10 is a schematic diagram of still another virtual object control method according to an embodiment of this application.

Specifically, description is made with reference to FIG. 10 by using an example in which the virtual object is a virtual vehicle. When the virtual vehicle is controlled to perform the second target action (for example, performing the drift-to-the-right action again), a force on the virtual vehicle includes: forward force 1002, steering force 1004, and friction 1006.

Further, after the movement state of the virtual vehicle is adjusted within the second target time period, for example, the steering force 1004 is increased and the friction 1006 is decreased in the adjustment. After the adjustment of the force, greater power accelerations are generated in a direction perpendicular to a vehicle body and in a forward direction of the virtual vehicle, so that a lateral speed vector 1008 and a movement speed vector 1010 of the virtual vehicle are greatly improved, and an energy value collected per unit time associated with the lateral speed vector can be correspondingly improved.

For example, it is assumed that the steering force to the virtual object is adjusted according to the first target proportion a %:

$$F_1 = F_0 * (1 + a\%),$$

where a % is the first target proportion and 0<a %<100%, $F_1$ is the second force parameter value, and $F_0$ is the first force parameter value.

It is assumed that the friction to the virtual object is adjusted according to the second target proportion b %:

$$f_1 = f_0 * b\%,$$

where b % is the second target proportion and 0<b %<100%, $f_1$ is the second friction parameter value, and $f_0$ is the first friction parameter value.

According to the embodiments provided in this application, parameter values of the steering force and the friction are adjusted according to the target proportions, to cause the virtual object to be adjusted from the first state to the second state, so that the virtual object can trigger state adjustment through the foregoing action execution process, thereby automatically adjusting energy collected per unit time and simplifying control operations over the virtual object.

In one embodiment, before the adjusting a first parameter value to a second parameter value corresponding to the second state according to a target proportion, the method further includes:

S1, determining a lateral speed vector of the virtual object according to the second parameter value, a direction of the lateral speed vector being perpendicular to a forward direction of the virtual object; and

S2, obtaining the second energy value corresponding to the lateral speed vector.

In some embodiments, in this embodiment, S2 of obtaining the second energy value corresponding to the lateral speed vector includes:

S21, obtaining a squared value of a speed identified by the lateral speed vector; and

S22, determining the second energy value according to the squared value, the second energy value being proportional to the squared value.

Figure 11:
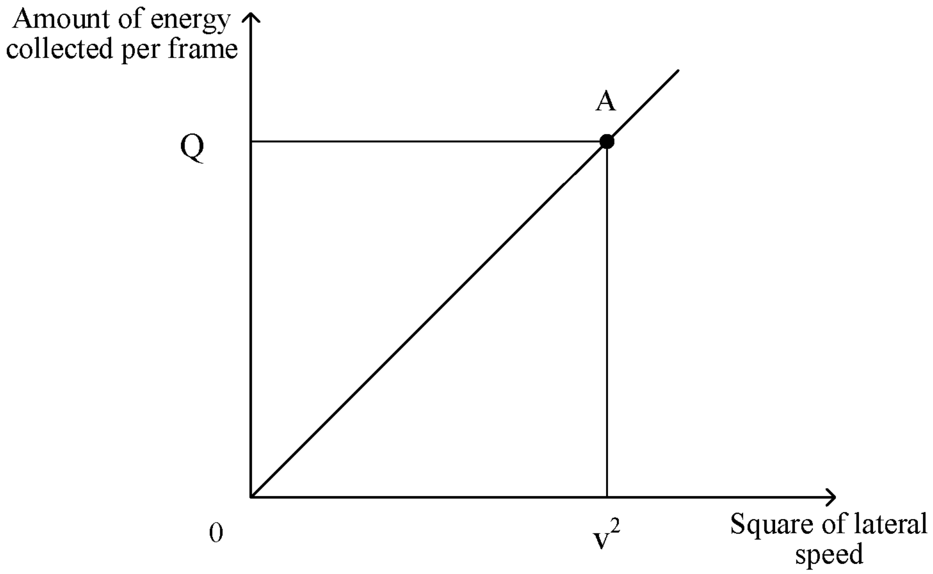
FIG. 11 is a schematic diagram of still another virtual object control method according to an embodiment of this application.

In this embodiment, energy collected per unit time for the energy tank is proportional to a square of a speed magnitude of the lateral speed vector (hereinafter referred to as a lateral speed for short). For example, the unit time may be, but is not limited to, a time for running one frame in the game, that is, the energy collected per unit time for the energy tank may also be referred to as "amount of energy collected per frame". For example, FIG. 11 is a relationship between the amount Q of energy collected per frame and the square v 2 of the lateral speed.

That is, the lateral speed vector 1008 of the virtual object may be determined according to the second parameter value after the adjustment. Further, an energy value Q corresponding to the second state may be directly calculated according to the squared value of the speed magnitude v of the lateral speed vector 1008.

For example, a calculation formula for determining the amount of energy collected corresponding to a point A is as follows:

$$Q_A = k(v_A)^2,$$

where $Q_A$ is an energy value obtained through calculation when the lateral speed is $v_A$. k is a coefficient required for calculation, and the coefficient may be set to, but is not limited to, different values according to different scenes.

Further, in this embodiment, when the energy collected in the energy tank reaches a trigger threshold, a state of the acceleration control button used for controlling to trigger an acceleration operation is adjusted to an active state, so that the player can timely perform an operation on the acceleration control button in the active state again, to control the virtual object to perform an acceleration operation again to enter an accelerated state, thereby shortening a total time consumed by the virtual object to complete a game task and improving a win rate of the virtual object in a racing game.

According to the embodiments provided in this application, adjustment of the lateral speed of the virtual object is controlled by adjusting parameter values of a force on the virtual object, so that energy collected (e.g., the amount of gas collected) per unit time associated with the lateral speed is also improved, thereby shortening a collection time of energy in the energy tank.

In one embodiment, after the controlling to adjust a movement state of the virtual object from a first state to a second state, the method further includes:

S1, obtaining, when an execution time of the second target action reaches a second threshold and a speed identified by a movement speed vector of the virtual object reaches a target threshold, an operation state of the virtual object performing the acceleration operation; and

S2, displaying prompt information on the client when the operation state indicates that the virtual object is in an accelerated state, the prompt information being used for indicating that the virtual object has completed an action combination, the action combination including the first target action and the second target action.

In this embodiment, after the state of the virtual object is adjusted from the first state to the second state, the execution time of the second target action still needs to be monitored, and when the execution time of the second target action reaches the second threshold and the movement speed vector (the movement speed vector shown in FIG. 10, which may be also referred to as an instantaneous speed vector) of the virtual object reaches the target threshold, the operation state of the virtual object performing an acceleration operation is obtained, and whether the prompt information is displayed is determined according to the operation state.

That is, in this embodiment, the player may be alternatively prompted on the client that the action combination is completed when the execution time of the second target action reaches the second threshold, the movement speed vector of the virtual object reaches the target threshold, and the virtual object is still in the accelerated state. For example, a "tap streak" identifier is displayed, to instruct to complete two drift actions: "tap drift" and a "streak".

According to the example provided in this application, the prompt information for prompting completion of the action combination is displayed to intuitively show a result generated by the virtual object control process to the user, thereby improving user experience.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Figure 12:
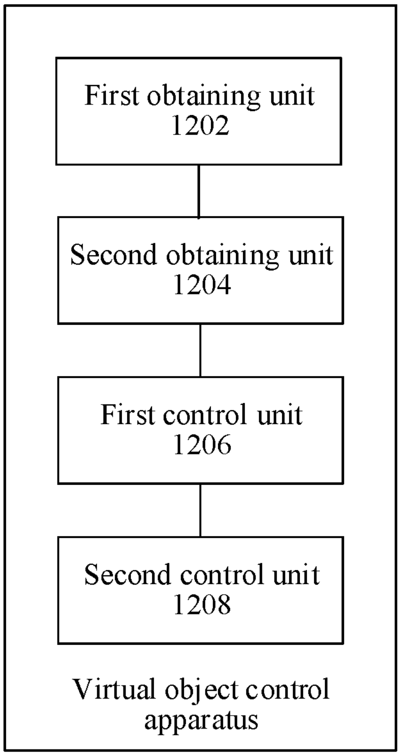
FIG. 12 is a schematic structural diagram of a virtual object control apparatus according to an embodiment of this application.

According to another aspect of the embodiments of this application, a virtual object control apparatus for implementing the virtual object control method is further provided. As shown in FIG. 12, the apparatus includes:

1) a first obtaining unit 1202, configured to obtain a first operation instruction in a process that a virtual object controlled by a client performs an acceleration operation, the first operation instruction being used for instructing to control the virtual object to perform a first target action;

2) a second obtaining unit 1204, configured to obtain a second operation instruction within a first target time period after the first target action is completed, the second operation instruction being used for instructing to control the virtual object to perform a second target action;

3) a first control unit 1206, configured to adjust a movement state of the virtual object from a first state to a second state within a second target time period after the virtual object starts to perform the second target action, a first energy value collected by the virtual object per unit time in the first state being less than a second energy value collected by the virtual object per unit time in the second state; and 4) a second control unit 1208, configured to adjust a state of an acceleration control button corresponding to the acceleration operation to an active state when an energy accumulation value of the collected energy reaches a trigger threshold.

The apparatus shown in FIG. 11 is applicable to, but is not limited to, the user equipment 102 and the server 112 in the virtual object control system shown in FIG. 1, and is also applicable to, but is not limited to, the user equipment 102 shown in FIG. 2. The foregoing description is merely an example, which is not limited in this embodiment.

In some embodiments, in this embodiment, the virtual object control apparatus is applicable to, but is not limited to, a game application, such as a racing game application. In a process that a client of the game application controls a virtual object to perform an action combination of a first target action and a second target action, adjustment of a movement state of the virtual object is triggered, so that efficiency of the virtual object of obtaining a game prop or a game ability is also adjusted. For example, by improving the energy value collected per unit time by an energy tank corresponding to a game prop or a game ability, it takes a shorter time for the energy accumulation value collected in the energy tank to reach a trigger threshold. The virtual object may be, but is not limited to, an object such as a virtual role, virtual equipment, or a virtual vehicle manipulated by a player in the racing game application. The first target action and the second target action may include, but are not limited to, a drift operation performed by the virtual object when passing through a bend configured in a game task. The first target action and the second target action may be, but are not limited to, drift actions performed according to the same direction. The foregoing description is merely an example, which is not limited in this embodiment.

According to the embodiments provided in this application, in a process that a virtual object performs an acceleration operation, after a first target action of which an execution time is less than a first threshold is completed, when a second operation instruction used for instructing to perform a second target action is obtained again within a first target time period, a movement state of the virtual object is controlled to adjust from a first state to a second state within a second target time period after the second target action is started, so that the virtual object starts to collect energy according to a second energy value corresponding to the second state. According to the foregoing control logic, a first energy value collected for an energy tank per unit time is triggered to be adjusted and increased to a greater second energy value, to improve the energy collection efficiency of the energy tank, thereby shortening a collection time for a collected energy accumulation value to reach a trigger threshold of the energy tank. In this way, it is unnecessary to perform a target action repeatedly to collect energy, thereby simplifying control operations on the virtual object and reducing operation complexity, thus further overcoming a problem of high operation complexity in virtual object control in the related art.

In one embodiment, the first control unit 1206 includes:

1) a first obtaining module, configured to obtain a first parameter value corresponding to a force on the virtual object in the first state; and
2) an adjustment module, configured to adjust the first parameter value to a second parameter value corresponding to the second state.

In some embodiments, in this embodiment, the adjustment module includes:

(1) a first adjustment submodule, configured to: when the force includes steering force, the first parameter value includes a first force parameter value, and the second parameter value includes a second force parameter value, increase the first force parameter value of the virtual object to the second force parameter value according to a first target proportion, a direction of the steering force being perpendicular to a forward direction of the virtual object; and
(2) a second adjustment submodule, configured to: when the force includes friction, the first parameter value includes a first friction parameter value, and the second parameter value includes a second friction parameter value, decrease the first friction parameter value of the virtual object to the second friction parameter value according to a second target proportion.

According to the embodiments provided in this application, parameter values of the steering force and the friction are adjusted according to the target proportions, to cause the virtual object to be adjusted from the first state to the second state, so that the virtual object can trigger state adjustment through the foregoing action execution process, thereby automatically adjusting energy collected per unit time and simplifying control operations over the virtual object.

In one embodiment, the first control unit further includes:

1) a determining module, configured to determine a lateral speed vector of the virtual object according to the second parameter value, a direction of the lateral speed vector being perpendicular to a forward direction of the virtual object; and
2) a second obtaining module, configured to obtain the second energy value corresponding to the lateral speed vector.

In some embodiments, in this embodiment, the second obtaining module includes:

(1) an obtaining submodule, configured to obtain a squared value of a speed identified by the lateral speed vector; and
(2) a determining submodule, configured to determine the second energy value according to the squared value, the second energy value being proportional to the squared value.

According to the embodiments provided in this application, adjustment of the lateral speed of the virtual object is controlled by adjusting parameter values of a force on the virtual object, so that energy collected (e.g., the amount of gas collected) per unit time associated with the lateral speed is also improved, thereby shortening a collection time of energy in the energy tank.

In one embodiment, the apparatus further includes:

1) a third obtaining unit, configured to obtain, when an execution time of the second target action reaches a second threshold and a speed identified by a movement speed vector of the virtual object reaches a target threshold, an operation state of the virtual object performing the acceleration operation, after the movement state of the virtual object is controlled to adjust from the first state to the second state; and
2) a display unit, configured to display prompt information on the client when the operation state indicates that the virtual object is in an accelerated state, the prompt information being used for indicating that the virtual object has completed an action combination, the action combination including the first target action and the second target action.

In this embodiment, the player may be alternatively prompted on the client that the action combination is completed when the execution time of the second target action reaches the second threshold, the movement speed vector of the virtual object reaches the target threshold, and the virtual object is still in the accelerated state. For example, a "tap streak" identifier is displayed, to instruct to complete two drift actions: "tap drift" and "streak".

According to the example provided in this application, the prompt information for prompting completion of the action combination is displayed to intuitively show a result generated by the virtual object control process to the user, thereby improving user experience.

Figure 13:
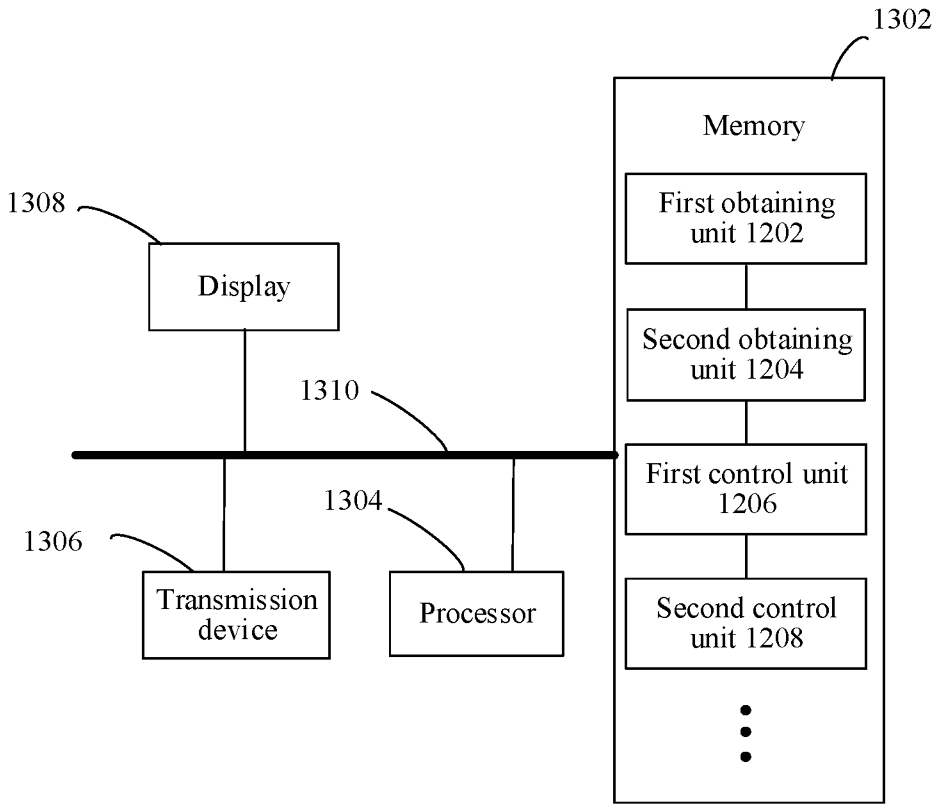
FIG. 13 is a schematic structural diagram of an electronic device according to an embodiment of this application.

According to yet another aspect of the embodiments of this application, an electronic device for implementing the above virtual object control method is further provided. As shown in FIG. 13, the electronic device includes a memory 1302 and a processor 1304. The memory 1302 stores a computer program, and the processor 1304 is configured to perform the steps in any one of the above method embodiments by using the computer program.

In some embodiments, in this embodiment, the electronic device may be located in at least one of a plurality of network devices in a computer network, such as the user equipment or the server.

In some embodiments, in this embodiment, the processor may be configured to perform the following steps by using the computer program:

S1, obtaining a first operation instruction in a process that a virtual object controlled by a client performs an acceleration operation, the first operation instruction being used for instructing to control the virtual object to perform a first target action;

S2, obtaining a second operation instruction within a first target time period after the first target action is completed, the second operation instruction being used for instructing to control the virtual object to perform a second target action;

S3, adjusting a movement state of the virtual object from a first state to a second state within a second target time period after the virtual object starts to perform the second target action, a first energy value collected by the virtual object per unit time in the first state being less than a second energy value collected by the virtual object per unit time in the second state; and S4, adjusting a state of an acceleration control button corresponding to the acceleration operation to an active state when an energy accumulation value of the collected energy reaches a trigger threshold.

In some embodiments, a person of ordinary skill in the art may understand that, the structure shown in FIG. 13 is only illustrative. The electronic device may also be a terminal device such as a smartphone (such as an Android mobile phone or an iOS mobile phone), a tablet computer, a palmtop computer, a mobile Internet device (MID), or a PAD. FIG. 13 does not constitute a limitation on the structure of the electronic device. For example, the electronic device may further include more or fewer components (such as a network interface) than those shown in FIG. 13, or have a configuration different from that shown in FIG. 13.

The memory 1302 may be configured to store a software program and a module, for example, a program instruction/module corresponding to the virtual object control method and apparatus in the embodiments of this application, and the processor 1304 performs various functional applications and data processing by running the software program and the module stored in the memory 1302, that is, implementing the foregoing virtual object control method. The memory 1302 may include a high-speed random memory, and may also include a non-volatile memory, for example, one or more magnetic storage apparatuses, a flash memory, or another nonvolatile solid-state memory. In some embodiments, the memory 1302 may further include memories remotely disposed relative to the processor 1304, and the remote memories may be connected to a terminal through a network. Examples of the network include, but are not limited to, the Internet, an intranet, a local area network, a mobile communication network, and a combination thereof. Specifically, the memory 1302 may be used for, but is not limited to, storing operation instructions, and information such as state information (for example, the first energy value) of the first state and state information (for example, the second energy value) of the second state. In an example, as shown in FIG. 13, the memory 1302 may include, but is not limited to, a first obtaining unit 1202, a second obtaining unit 1204, a first control unit 1206, and a second control unit 1208 in the virtual object control apparatus. In addition, the memory may also include, but is not limited to, other modules and units in the virtual object control apparatus, which will not be elaborated in this example.

In some embodiments, a transmission device 1306 is configured to receive or transmit data through a network. Specific examples of the foregoing network may include a wired network and a wireless network. In an example, the transmission device 1306 includes a network interface controller (NIC). The NIC may be connected to another network device and a router by using a network cable, so as to communicate with the Internet or a local area network. In an example, the transmission device 1306 is a radio frequency (RF) module, which communicates with the Internet in a wireless manner.

In addition, the foregoing electronic device further includes: a display 1308, configured to display a first target action, a second target action, and corresponding buttons; and a connection bus 1310, configured to connect various module components in the foregoing electronic device.

According to yet another aspect of the embodiments of this application, a storage medium is further provided. The storage medium stores a computer program, the computer program being configured to perform steps in any one of the foregoing method embodiments when run.

In some embodiments, in this embodiment, the storage medium may be configured to store a computer program for performing the following steps:

S1, obtaining a first operation instruction in a process that a virtual object controlled by a client performs an acceleration operation, the first operation instruction being used for instructing to control the virtual object to perform a first target action;

S2, obtaining a second operation instruction within a first target time period after the first target action is completed, the second operation instruction being used for instructing to control the virtual object to perform a second target action;

S3, adjusting a movement state of the virtual object from a first state to a second state within a second target time period after the virtual object starts to perform the second target action, a first energy value collected by the virtual object per unit time in the first state being less than a second energy value collected by the virtual object per unit time in the second state; and S4, adjusting a state of an acceleration control button corresponding to the acceleration operation to an active state when an energy accumulation value of the collected energy reaches a trigger threshold.

An embodiment of this application further provides a computer program product including instructions, the instructions, when run on a server, causing the server to perform the method according to the foregoing embodiments.

In some embodiments, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another method. The apparatus embodiments described above are merely exemplary. For example, the division of the units is merely the division of logic functions, and may use other division methods during implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The modules or units described as separate components may or may not be physically separated, and the components displayed as units may or may not be physical units, and may be located in one place or may be distributed over a plurality of network units. Some or all of the units may be selected according to the needs to achieve the objectives of the solutions of the embodiments.

In addition, functional modules or units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A method for controlling a virtual object, performed by at least one processor and a memory of an electronic device, the method comprising:

displaying, by the at least one processor on a display screen coupled to the at least one processor, a gaming interface that includes a virtual object, a movement of the virtual object being controlled based on user operation instruction received by an input device coupled to the at least one processor;

detecting, by the at least one processor, a first operation instruction on the input device in a process that the virtual object performs an acceleration operation, the first operation instruction instructing the virtual object to perform a first target action;

detecting, by the at least one processor, a second operation instruction on the input device within a first target time period after the first target action is completed, the second operation instruction instructing the virtual object to perform a second target action;

determining whether a drift angle of the virtual object upon completing the first target action is less than a drift angle threshold; and in response to determining that the drift angle is less than the drift angle threshold and the second operation instruction is received within the first target time period of completing the first target action, adjusting a movement state of the virtual object from a first state to a second state within a second target time period after the virtual object starts to perform the second target action, comprising: increasing a force parameter value of a steering force on the virtual object.

2. The method according to claim 1, wherein the adjusting a movement state of the virtual object from a first state to a second state within a second target time period after the virtual object starts to perform the second target action further comprises:

decreasing a friction parameter value of a friction on the virtual object.

3. The method according to claim 2, wherein decreasing the friction parameter value of the friction on the virtual object comprises:

obtaining a first friction parameter value of the friction on the virtual object in the first state; and decreasing the first friction parameter value to a second friction parameter value of the friction on the virtual object in the second state according to a second target proportion.

4. The method according to claim 1, wherein increasing the force parameter value of the steering force on the virtual object comprises:

obtaining a first force parameter value of the steering force on the virtual object in the first state; and increasing the first force parameter value to a second force parameter value of the steering force on the virtual object in the second state according to a first target proportion.

5. The method according to claim 1, wherein:

the first operation instruction is received when the virtual object is in a bend with a bend angle less than an angle threshold.

6. The method according to claim 1, further comprising:

adjusting a state of an acceleration control button corresponding to the acceleration operation to an active state when an energy accumulation value of an energy collected based on a movement of the virtual object reaches a trigger threshold.

7. The method according to claim 6, wherein:

a first energy value collected by the virtual object per unit time in the first state is less than a second energy value collected by the virtual object per unit time in the second state.

8. The method according to claim 6, wherein:

the adjusted movement state changes a lateral speed of the virtual object, a direction of a lateral speed vector of the lateral speed being perpendicular to the forward direction of the virtual object; and an energy value collected by the virtual object per unit time in the second state is determined based on a value of the lateral speed.

9. The method according to claim 8, further comprising:

obtaining a squared value of the lateral speed; and determining a second energy value corresponding to the lateral speed according to the squared value, the second energy value being proportional to the squared value.

10. The method according to claim 1, wherein after the adjusting a movement state of the virtual object from a first state to a second state, the method further comprises:

obtaining, when an execution time of the second target action reaches a second threshold and a speed identified by a movement speed vector of the virtual object reaches a target threshold, an operation state of the virtual object performing the acceleration operation; and displaying prompt information on the client when the operation state indicates that the virtual object is in an accelerated state, the prompt information indicating that the virtual object has completed an action combination, the action combination comprising the first target action and the second target action.

11. The method according to claim 1, wherein the first target action and the second target action are drift actions performed according to a same direction.

12. An apparatus for controlling a virtual object, comprising at least one memory and at least one processor, the at least one memory storing a computer program, the at least one processor, when executing the computer program, being configured to:

display, on a display screen coupled to the at least one processor, a gaming interface that includes a virtual object, a movement of the virtual object being controlled based on user operation instruction received by an input device coupled to the at least one processor;

detect a first operation instruction on the input device in a process that the virtual object performs an acceleration operation, the first operation instruction instructing the virtual object to perform a first target action;

detect a second operation instruction on the input device within a first target time period after the first target action is completed, the second operation instruction instructing the virtual object to perform a second target action;

determine whether a drift angle of the virtual object upon completing the first target action is less than a drift angle threshold; and in response to determining that the drift angle is less than the drift angle threshold and the second operation instruction is received within the first target time period of completing the first target action, adjust a movement state of the virtual object from a first state to a second state within a second target time period after the virtual object starts to perform the second target action, comprising: increasing a force parameter value of a steering force on the virtual object.

13. The apparatus according to claim 12, wherein the adjusting a movement state of the virtual object from a first state to a second state within a second target time period after the virtual object starts to perform the second target action further comprises:

decreasing a friction parameter value of a friction on the virtual object.

14. The apparatus according to claim 13, wherein decreasing the friction parameter value of the friction on the virtual object comprises:

obtaining a first friction parameter value of the friction on the virtual object in the first state; and decreasing the first friction parameter value to a second friction parameter value of the friction on the virtual object in the second state according to a second target proportion.

15. The apparatus according to claim 12, wherein increasing the force parameter value of the steering force on the virtual object comprises:

obtaining a first force parameter value of the steering force on the virtual object in the first state; and increasing the first force parameter value to a second force parameter value of the steering force on the virtual object in the second state according to a first target proportion.

16. The apparatus according to claim 12, wherein:

the first operation instruction is received when the virtual object is in a bend with a bend angle less than an angle threshold.

17. The apparatus according to claim 12, wherein a first energy value collected by the virtual object per unit time in the first state is less than a second energy value collected by the virtual object per unit time in the second state, and the at least one processor is further configured to perform:

adjusting a state of an acceleration control button corresponding to the acceleration operation to an active state when an energy accumulation value of an energy collected based on a movement of the virtual object reaches a trigger threshold.

18. A non-transitory computer readable storage medium, comprising a computer program stored therein, the computer program, when executed by at least one processor, causing the at least one processor to perform:

displaying, on a display screen coupled to the at least one processor, a gaming interface that includes a virtual object, a movement of the virtual object being controlled based on user operation instruction received by an input device coupled to the at least one processor;

detecting a first operation instruction on the input device in a process that the virtual object performs an acceleration operation, the first operation instruction instructing the virtual object to perform a first target action;

detecting a second operation instruction on the input device within a first target time period after the first target action is completed, the second operation instruction instructing the virtual object to perform a second target action;

determining whether a drift angle of the virtual object upon completing the first target action is less than a drift angle threshold; and in response to determining that the drift angle is less than the drift angle threshold and the second operation instruction is received within the first target time period of completing the first target action, adjusting a movement state of the virtual object from a first state to a second state within a second target time period after the virtual object starts to perform the second target action, comprising: increasing a force parameter value of a steering force on the virtual object.

* * * * *